US009619185B2

(12) United States Patent
Matsumoto

(10) Patent No.: US 9,619,185 B2
(45) Date of Patent: Apr. 11, 2017

(54) DATA COMMUNICATION APPARATUS, HISTORY INFORMATION STORAGE METHOD, AND STORAGE MEDIUM

(71) Applicant: CANON KABUSHIKI KAISHA, Tokyo (JP)

(72) Inventor: Yoshitaka Matsumoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/798,577

(22) Filed: Jul. 14, 2015

(65) Prior Publication Data

US 2016/0019444 A1 Jan. 21, 2016

(30) Foreign Application Priority Data

Jul. 16, 2014 (JP) ................................ 2014-145783

(51) Int. Cl.

*H04N 1/00* (2006.01)
*G06F 3/12* (2006.01)
*G06K 15/00* (2006.01)

(52) U.S. Cl.

CPC .......... *G06F 3/1222* (2013.01); *G06F 3/1273* (2013.01); *G06F 3/1285* (2013.01)

(58) Field of Classification Search

CPC .... G06F 3/1205; G06F 3/1237; G06F 3/1273; G06F 11/3419; G06F 11/3485; G06F 17/30144; G06F 17/30185
USPC ....... 358/1.11–1.18, 403, 404, 524; 707/648, 707/672, 758, 769; 718/100–106
See application file for complete search history.

(56) References Cited

U.S. PATENT DOCUMENTS 8,451,483 B2 * 5/2013 Yamada ................ G06F 3/1203 358/1.15
2002/0054109 A1 * 5/2002 Ogino .................. G06F 3/1205 715/764
2004/0201689 A1 * 10/2004 Quintana .............. G06Q 10/10 348/207.1
2005/0243366 A1 * 11/2005 Fukuda ............. G06Q 10/0875 358/1.15
2007/0127049 A1 * 6/2007 Bystrom .............. G06F 3/1204 358/1.13
2008/0313156 A1 * 12/2008 Hirahara ................ G06Q 10/06
2010/0182640 A1 * 7/2010 Daigo ..................... G06F 21/33 358/1.15
2012/0069395 A1 * 3/2012 Hiraike ................. G06F 3/1203 358/1.15

FOREIGN PATENT DOCUMENTS

JP 2010287107 A * 12/2010
JP 2014014023 A 1/2014

* cited by examiner

*Primary Examiner* — Chad Dickerson
(74) *Attorney, Agent, or Firm* — Rossi, Kimms & McDowell LLP

(57) ABSTRACT

A history information storage method making it possible to identify a user who gave a data transmission instruction from history information. A job processing apparatus is caused to execute a job. A generation step of generating history information, about the job in which information identifying a user included in a name of the job is set as information indicating the user who gave an instruction to execute the job, is generated in a generation step. The generated history information is stored in a storage step.

6 Claims, 15 Drawing Sheets

402

TRANSMISSION REQUEST FILE

| DESTINATION NAME (403) | DESTINATION FAX NUMBER (404) | PERSON IN CHARGE (405) | REQUEST ID (406) | TRANSMISSION SOURCE NAME (407) |
|---|---|---|---|---|
| ○× COMPANY | 031111XXXX | C-00001 | R-00001 | △△ COMPANY |

| TRANSMISSION SOURCE FAX NUMBER (408) | PRODUCT NAME (409) | PRODUCT NUMBER (410) | THE NUMBER OF ARTICLES (411) | UNIT PRICE (412) |
|---|---|---|---|---|
| 032222XXXX | PARTS 1 | PARTS_0001 | 10 | 1000 |

502

IMAGE LOG LIST FILE

| DATE (505) | JHDID (506) | JOBNAME (507) |
|---|---|---|
| 20140407 | 191741993_0000000000_0BAD20280D | R-00001_C-00001_○× COMPANY_031111XXXX_20140407191737 |

| USERNAME (508) | JOBTRACKINGID (509) |
|---|---|
| Administrator | 047a4582edba4a02a1da3c16e8769490 |

| JHR (510) | TIFF (511) |
|---|---|
| 20140407¥LOG INFORMATION FILE | 20140407¥IMAGE FILE |

503

LOG INFORMATION FILE

| JOBTRACKINGID (512) | NAME (513) | NUMBER (514) |
|---|---|---|
| 047a4582edba4a02a1da3c16e8769490 | ○× COMPANY | 031111XXXX |

FIG. 6A
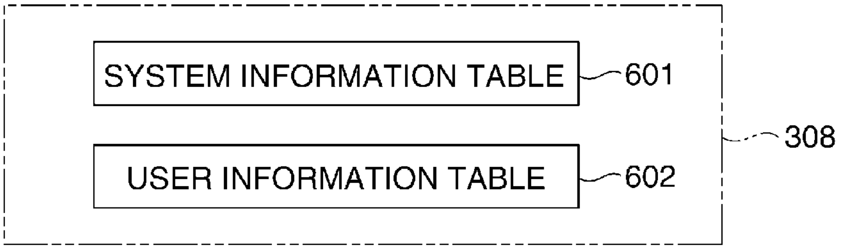
FIG. 6B
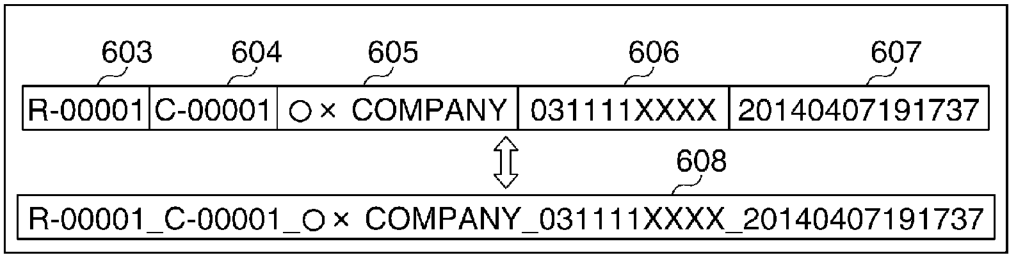
FIG. 6C
601
SYSTEM INFORMATION TABLE
609
| KEY1 | KEY2 | KEY3 | DATA | |
|---|---|---|---|---|
| DOCUMENT | DOC_RULE | SPLIT_CHAR | _ | 610 |
| DOCUMENT | DOC_RULE | ORDER_POS | 5 | 611 |
| DOCUMENT | DOC_RULE | CHARGE_POS | 4 | 612 |
| DOCUMENT | DOC_RULE | PARTNER_POS | 3 | 613 |
| DOCUMENT | DOC_RULE | PARTNER_TEL_POS | 2 | 614 |
| DOCUMENT | DOC_RULE | DATETIME_POS | 1 | 615 |
FIG. 6D
602
USER INFORMATION TABLE
616 617
| ID | NAME | CHARGE_INFO |
|---|---|---|
| 1 | TARO SUZUKI | C-00001 |

702 703

| TRANSMISSION HISTORY INFORMATION FILE | |
|---|---|
| Cabinet | RootPath |
| TRANSMISSION HISTORY | TRANSMISSION HISTORY FOLDER |

TRANSMISSION HISTORY LIST FILE

| TIME (901) | TYPE (902) | PATH (903) |
|---|---|---|
| 2014/04/07 19:43:30.207 | Changed | 2014\04\07\IMAGE FILE |

DOCUMENT INFORMATION FILE

| TIME (904) | JHDID (905) | JOBNAME (906) | USERNAME (907) |
|---|---|---|---|
| 20140407 | 191741993_0000000000_0BAD20280D | R-00001_A-00001_○× COMPANY_031111XXXX_20140407191737 | TARO SUZUKI |

HISTORY INFORMATION FILE

| JOBTRACKINGID (908) | NAME (909) | NUMBER (910) |
|---|---|---|
| 047a4582edba4a02a1da3c16e8769490 | ○× COMPANY | 031111XXXX |

TRANSMISSION STATUS FILE

| ENDTIME (911) | STATUS (912) |
|---|---|
| 2014-04-07 19:45:00.000 | OK |

PURCHASE ORDER

TO ○× COMPANY

| | |
|---|---|
| PURCHASE ORDER DATE | 2014/04/24 |
| ORDER ACCEPTANCE ID | R-00001 |

| | |
|---|---|
| TOTAL AMOUNT | ¥10,500 |

| PRODUCT NUMBER | PRODUCT NAME | THE NUMBER OF ARTICLES | UNIT PRICE | AMOUNT | DESIRED DELIVERY DATE |
|---|---|---|---|---|---|
| PARTS_0001 | PARTS 1 | 10 | 1000 | ¥10,000 | |
| | | | | | |
| | | | | | |
| | | | | | |
| | | | | | |
| | | | | | |
| | | | | | |
| | | | | | |
| | | | | | |

| | |
|---|---|
| SUBTOTAL | ¥10,000 |
| CONSUMPTION TAX | ¥500 |
| TOTAL | ¥10,500 |

REMARKS COLUMN

DATA COMMUNICATION APPARATUS, HISTORY INFORMATION STORAGE METHOD, AND STORAGE MEDIUM

BACKGROUND OF THE INVENTION

Field of the Invention

The present invention relates to a data communication apparatus, a history information storage method and a storage medium, and more particularly to a data communication apparatus storing history information about a job.

Description of the Related Art

There are data transmission systems in which an image forming apparatus such as an MFP performs data transmission such as facsimile transmission on the basis of a job transmitted from a data communication apparatus such as a facsimile server. In some data transmission systems, a user uses a mobile terminal or the like to instruct a data communication apparatus to transmit data while on the go (see, for example, Japanese Laid-Open Patent Publication (Kokai) No. 2014-014023).

Based on the data transmission instruction from the user, the data communication apparatus transmits a job for performing data transmission to the image forming apparatus, and the image forming apparatus performs data transmission on the basis of the job. After the image forming apparatus performs the data transmission, the data communication apparatus transmits history information about the data transmission to an information processing apparatus such as a file server. The transmitted history information includes, for example, information about the user who gave the data transmission instruction, the transmission date and time and a data transmission result, and the history information is stored into the information processing apparatus.

In addition to transmitting a job to the image forming apparatus on the basis of a data transmission instruction from the user, the data communication apparatus may perform automatic data transmission according to a transmission condition set by means of a client PC in advance. For example, the data communication apparatus transmits a job for performing automatic data transmission of a purchase order, which is transmitted when a product is ordered in a predetermined format through Internet order, to the image forming apparatus, and the image forming apparatus performs automatic data transmission. Again in this case, the data communication apparatus transmits history information about the automatic data transmission to the information processing apparatus, and the transmitted history information is stored into the information processing apparatus.

However, there may be a case where it is not possible to easily identify a user who gave a data transmission instruction from history information.

For example, in automatic data transmission performed by a data communication apparatus such as a facsimile server, information identifying a user who gave a data transmission instruction is not stored into history information. Instead, ID information about a data communication apparatus which transmitted a job for performing automatic data transmission or "Administrator", which is identifier information about an apparatus administrator, is stored in the history information. In this case, it is not possible to identify a user who gave a data transmission instruction from the history information.

SUMMARY OF THE INVENTION

The present invention provides a data communication apparatus and a history information storage method making it possible to identify a user who gave a data transmission instruction from history information, and a storage medium.

Accordingly, the present invention provides a data communication apparatus, comprising an execution instruction unit configured to cause a job processing apparatus to execute a job, a generation unit configured to generate history information about the job in which information identifying a user included in a name of the job is set as information indicating the user who gave an instruction to execute the job, and a storage unit configured to store the generated history information.

According to the present invention, history information about a job is generated in which information identifying a user included in the name of the job is set as information showing a user who gave an instruction to execute the job. Thereby, it is possible to identify the user who gave a data transmission instruction from the history information.

Further features of the present invention will become apparent from the following description of exemplary embodiments (with reference to the attached drawings).

BRIEF DESCRIPTION OF THE DRAWINGS

FIGS. 3A to 3D are diagrams for illustrating a configuration of software in the data communication system of FIG. 1, wherein FIG. 3A shows a configuration of software in the data communication apparatus, FIG. 3B shows a configuration of software in the image forming apparatus, FIG. 3C shows a configuration of software in a transmission request server, and FIG. 3D shows a configuration of software in an information processing apparatus.

FIGS. 4A and 4B are diagrams for illustrating a configuration of a transmission request storage area in FIG. 3A, wherein FIG. 4A shows a configuration of a transmission request folder, and FIG. 4B shows a transmission request file.

FIGS. 5A to 5C are diagrams for illustrating a configuration of an image log storage area in FIG. 3A, wherein FIG. 5A shows a configuration of an image log folder, FIG. 5B shows an image log list file, and FIG. 5C shows a log information file.

FIGS. 6A to 6D are diagrams for illustrating a configuration of a database in FIG. 3A, wherein FIG. 6A shows the configuration of the database, FIG. 6B shows job name data generated on the basis of the database, FIG. 6C shows a system information table, and FIG. 6D shows a user information table.

FIGS. 7A and 7B are diagrams for illustrating a configuration of a transmission history information storage area in FIG. 3A, wherein FIG. 7A shows a configuration of a transmission history information folder, and FIG. 7B shows a transmission history information file.

FIGS. 9A to 9D are diagrams for illustrating each file stored in the transmission history folder of FIG. 8, wherein FIG. 9A shows a transmission history list file, FIG. 9B shows a document information file, FIG. 9C shows a history information file, and FIG. 9D shows a transmission status file.

FIG. 12 is a diagram for illustrating facsimile transmission data generated in the data transmission process of FIG. 11.

DESCRIPTION OF THE EMBODIMENTS

An embodiment of the present invention will be described below in detail with reference to drawings.

In the present embodiment, a data communication system in which data transmission such as automatic facsimile transmission is performed on the basis of a transmission condition set in advance by a user will be described below in detail. It should be noted that, though description will be made on a case where the present invention is applied to automatic facsimile transmission, an example of automatic data transmission, in the present embodiment, the present invention is not limited to automatic facsimile transmission but may be applied to automatic mail transmission and the like.

Figure 1:
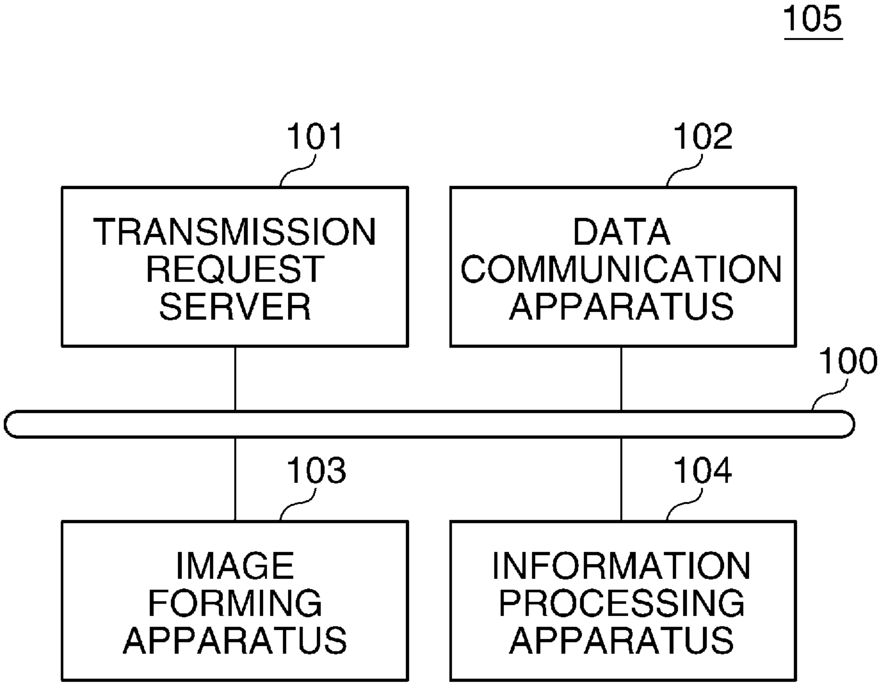
FIG. 1 is a block diagram schematically showing a configuration of a data communication system which includes a data communication apparatus according to an embodiment of the present invention.

FIG. 1 is a block diagram schematically showing a configuration of a data communication system 105 which includes a data communication apparatus 102 according to the embodiment of the present invention.

In FIG. 1, the data communication system 105 is provided with a transmission request server 101, the data communication apparatus 102, an image forming apparatus 103, an example of a job processing apparatus, and an information processing apparatus 104 which are connected with one another via a LAN 100.

In the data communication system 105, the transmission request server 101 transmits a facsimile transmission instruction to the data communication apparatus 102 on the basis of a transmission condition for automatic facsimile transmission set in advance. Furthermore, in the data communication system 105, the data communication apparatus 102 transmits a job for performing facsimile transmission to the image forming apparatus 103 on the basis of the facsimile transmission instruction to instruct the image forming apparatus 103 to execute facsimile transmission. The image forming apparatus 103 performs facsimile transmission on the basis of the received job. After the image forming apparatus 103 performs the facsimile transmission, the data communication apparatus 102 stores history information about the facsimile transmission into the information processing apparatus 104 or the like which is to be a storage destination of the history information.

Though description will be made on a case where the history information is stored into the information processing apparatus 104 in the present embodiment, the storage destination of the history information is not limited to the information processing apparatus 104. For example, the history information may be stored into the data communication apparatus 102. It should be noted that the kind of the job is not limited to facsimile transmission but may be mail transmission.

The transmission request server 101 generates a transmission request file 402 shown in FIG. 4B, which is to be described later, on the basis of a transmission condition for automatic facsimile transmission set in advance by a user with the use of a client PC or the like not shown. The transmission request server 101 transmits the generated transmission request file 402 to a transmission request folder 401 shown in FIG. 4A, which is to be described later, in the data communication apparatus 102.

When detecting that the transmission request file 402 has been transmitted to the transmission request folder 401 by monitoring the transmission request folder 401, the data communication apparatus 102 transmits a job for performing facsimile transmission, to the image forming apparatus 103. The image forming apparatus 103 facsimile-transmits data on the basis of the job transmitted from the data communication apparatus 102 and notifies the data communication apparatus 102 of a facsimile transmission result.

The information processing apparatus 104 stores history information about the facsimile transmission transmitted from the data communication apparatus 102 after the image forming apparatus 103 facsimile-transmits the data. The history information shows, for example, information about the user who has dispatched a facsimile transmission instruction, the facsimile transmission date and time, and the facsimile transmission result.

Figure 2:
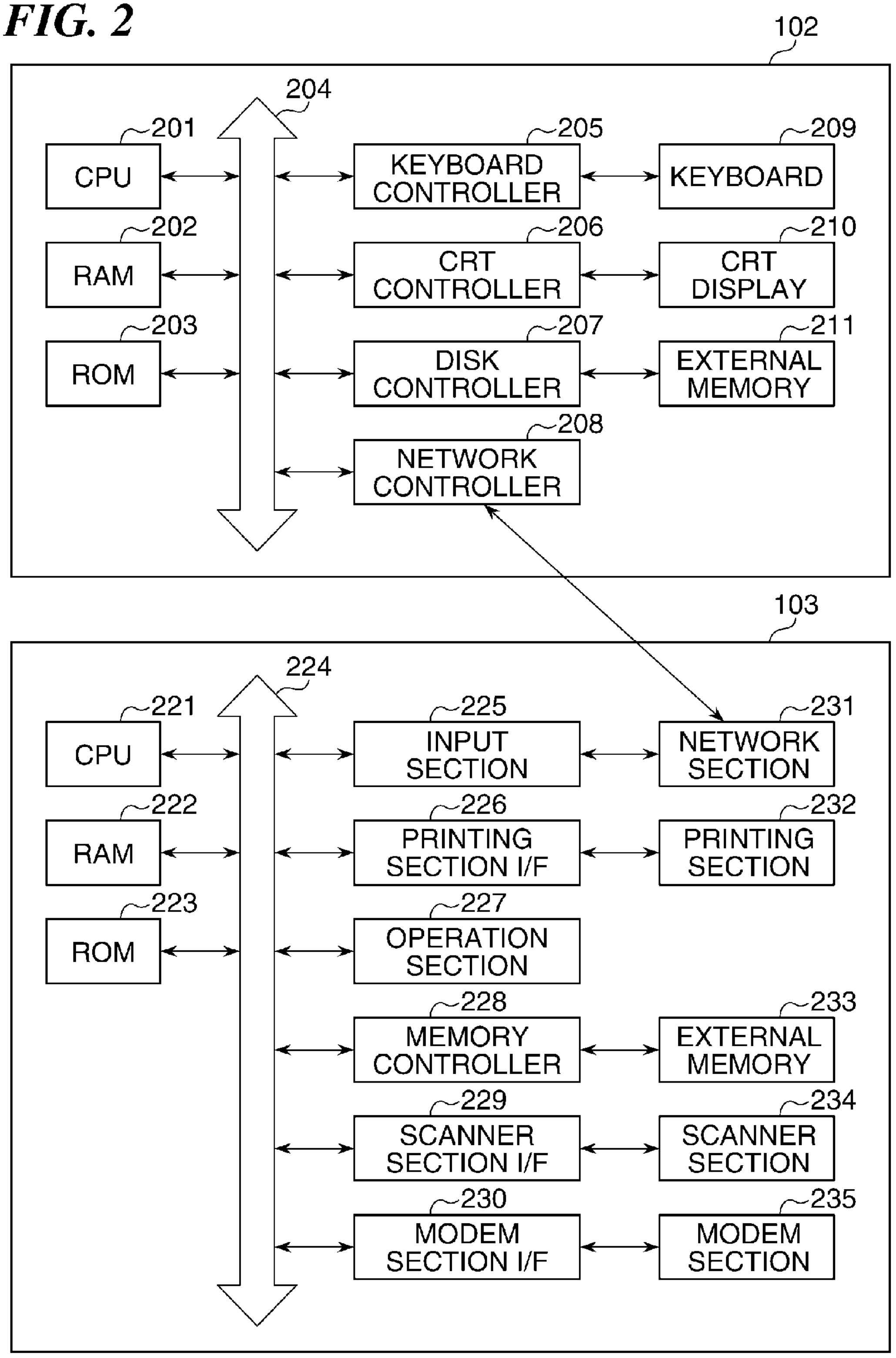
FIG. 2 is a block diagram schematically showing configurations of the data communication apparatus and an image forming apparatus in FIG. 1.

FIG. 2 is a block diagram schematically showing configurations of the data communication apparatus 102 and the image forming apparatus 103 in FIG. 1.

The data communication apparatus 102 in FIG. 2 is provided with a CPU 201, a RAM 202, a ROM 203 and a keyboard controller 205. Further, the data communication apparatus 102 is provided with a CRT controller 206, a disk controller 207 and a network controller 208. These components are connected to one another via a bus 204. Furthermore, the data communication apparatus 102 is provided with a keyboard 209, a CRT display 210 and an external memory 211.

The image forming apparatus 103 in FIG. 2 is provided with a CPU 221, a RAM 222, a ROM 223, an input section 225 and a printing section I/F 226. Further, the image forming apparatus 103 is provided with an operation section 227, a memory controller 228, a scanner section I/F 229 and a modem section I/F 230. These components are connected to one another via a bus 224. Furthermore, the image forming apparatus 103 is provided with a network section 231, a printing section 232, an external memory 233, a scanner section 234 and a modem section 235.

The CPU 201 executes a program stored in the ROM 203 or a program stored into the RAM 202 from the external memory 211 to control each component connected to the bus 204. The RAM 202 is used as a work area or the like, as a main memory of the CPU 201. The keyboard controller 205 outputs information inputted by the keyboard 209 or a pointing device not shown to the CPU 201.

The CRT controller 206 causes various kinds of information to be displayed on the CRT display 210 on the basis of a control signal outputted from the CPU 201. The disk controller 207 controls data communication of various kinds of data performed with the external memory 211. The network controller 208 performs communication with the image forming apparatus 103 and the like connected via a LAN 10.

The CPU 221 executes a program stored in the ROM 223 or a program stored into the RAM 222 from the external memory 233 to control each component connected to the bus 224. The RAM 222 is used as a work area, an output information development area, an environment data storage area, an NVRAM and the like, as a main memory of the CPU 221, and the memory capacity of the RAM 222 is extended by an optional RAM not shown, which is connected with an add-on port.

The ROM 223 stores, for example, a control program of the CPU 221, font data used at the time of generating output information, and information to be communicated with the data communication apparatus 102. The input section 225 performs communication with the data communication apparatus 102 via the network section 231 and transmits information about the image forming apparatus 103 transmitted from the CPU 221 and the like to the data communication apparatus 102.

The printing section 232 receives an image signal generated by processing by the CPU 221 via the printing section I/F 226 and executes a printing process on the basis of the received image signal. The operation section 227 is provided with switches for operating the image forming apparatus 103, an LED indicator and the like. The memory controller 228 controls data communication with the external memory 233. The external memory 233 stores, for example, font data, an emulation program and form data.

The scanner section 234 receives an image signal generated by processing by the CPU 221 via the scanner section I/F 229 and executes a scanning process on the basis of the received image signal. The modem section 235 is connected to the bus 224 via the modem section I/F 230. The modem section 235 receives facsimile communication transmitted from the outside via a public circuit and performs facsimile transmission to the outside via the public circuit.

Figure 3A:
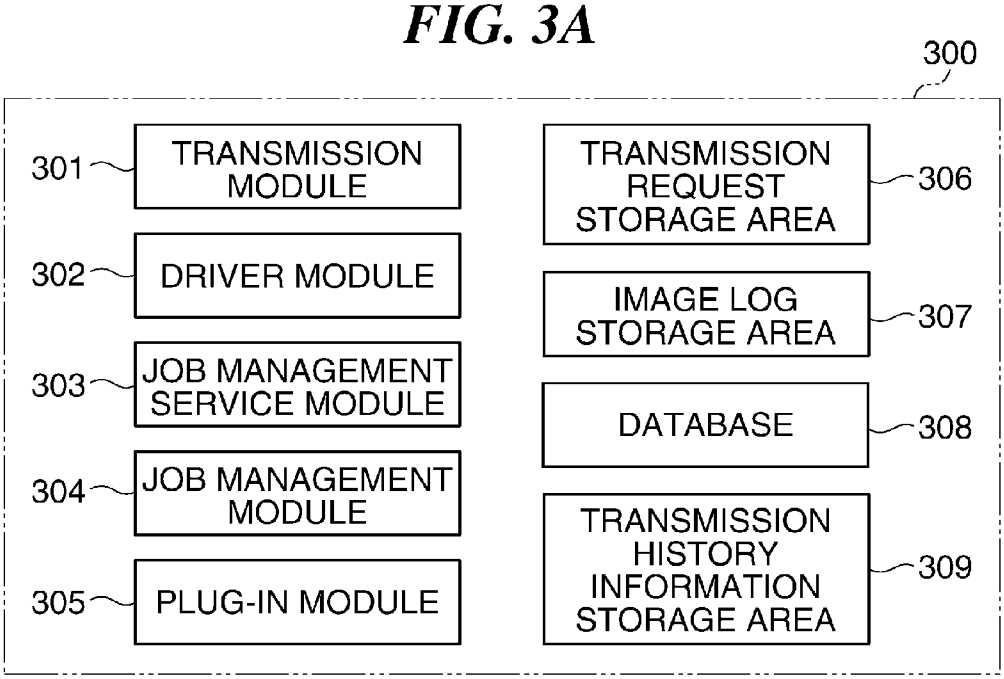
Figure 3B:
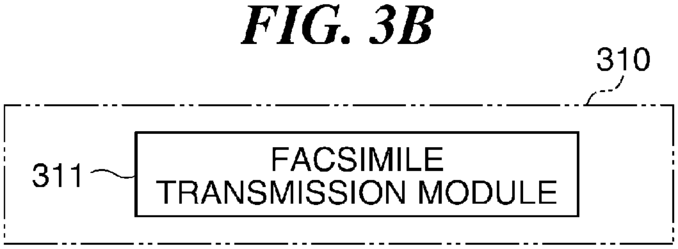
Figure 3C:
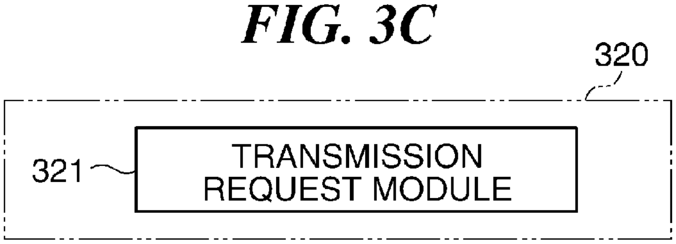
Figure 3D:
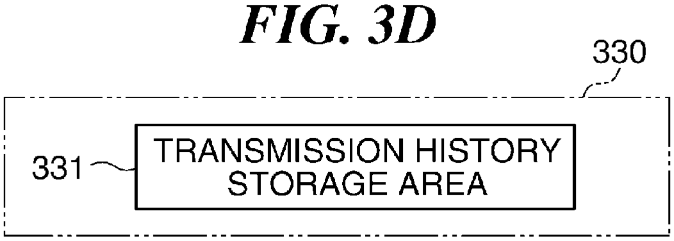

FIGS. 3A to 3D are diagrams for illustrating a configuration of software in the data communication system 105 of FIG. 1, and FIG. 3A shows a configuration of software in the data communication apparatus 102. FIG. 3B shows a configuration of software in the image forming apparatus 103. FIG. 3C shows a configuration of software in the transmission request server 101. FIG. 3D shows a configuration of software in the information processing apparatus 104. Each apparatus may have software other than the software shown in FIGS. 3A to 3D.

Software 300 in the data communication apparatus 102 in FIG. 3A is provided with a transmission module 301, a driver module 302, a job management service module 303 and a job management module 304. Further, the software 300 is provided with a plug-in module 305, a transmission request storage area 306, an image log storage area 307, a database 308 and a transmission history information storage area 309. The software 300 is controlled by the CPU 201 executing the program stored in the ROM 203 or the RAM 202.

Software 310 in the image forming apparatus 103 in FIG. 3B is provided with a facsimile transmission module 311. The software 310 is controlled by the CPU 221 executing the program stored in the ROM 223 or the RAM 222. Software 320 in the transmission request server 101 in FIG. 3C is provided with a transmission request module 321. Software 330 in the information processing apparatus 104 in FIG. 3D is provided with a transmission history storage area 331.

The transmission module 301 monitors the transmission request storage area 306 and detects that the transmission request file 402 shown in FIG. 4B, which is to be described later, has been stored into the transmission request storage area 306. When detecting that the transmission request file 402 has been stored, the transmission module 301 generates facsimile transmission data 1201 shown in FIG. 12, which is to be described later, and job name data 608 shown in FIG. 6B, which is to be described later. Furthermore, the transmission module 301 outputs the facsimile transmission data 1201, the job name data 608, and various kinds of data including information used for generating the job name data 608 to the driver module 302.

The driver module 302 transmits the various kinds of data outputted from the transmission module 301 to the image forming apparatus 103. Furthermore, the driver module 302 outputs information about the various kinds of data transmitted to the image forming apparatus 103, for example, an image log list file 502 shown in FIG. 5B, which is to be described later, to the image log storage area 307.

The job management service module 303 activates the job management module 304. The job management module 304 monitors the image log storage area 307.

When detecting that the image log list file 502 stored in the image log storage area 307 has been updated, the job management module 304 outputs the image log list file 502 to the plug-in module 305. Further, the job management module 304 transmits the image log list file 502 updated by the plug-in module 305 to the transmission history storage area 331 in the software 330.

The plug-in module 305 acquires information set for "JOBNAME 507" in the image log list file 502 and changes information set for "USERNAME 508" in the image log list file 502 on the basis of the database 308.

Figures 4A, 4B:
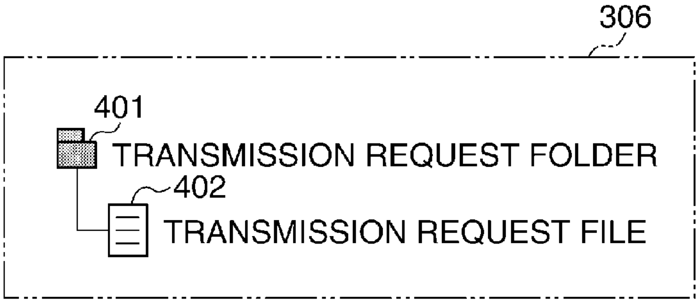

In the transmission request storage area 306, the transmission request folder 401 shown in FIG. 4A is provided, and the transmission request file 402 shown in FIG. 4B, which is transmitted from the transmission request module 321, is stored in the transmission request folder 401.

Figures 5A, 5B, 5C:
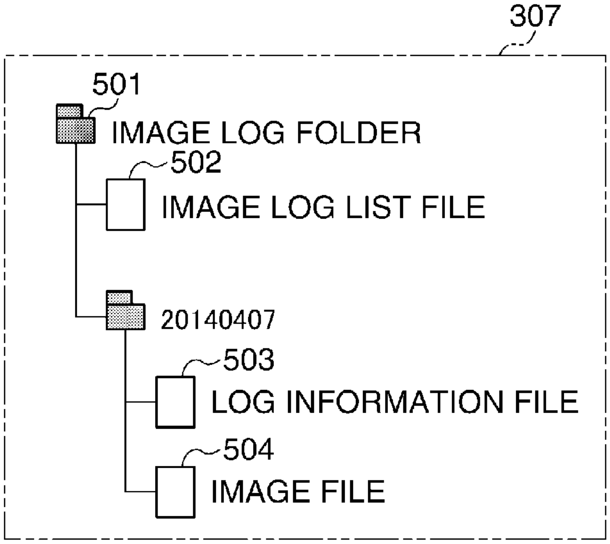

In the image log storage area 307, an image log folder 501 shown in FIG. 5A is provided, and the image log list file 502 shown in FIG. 5B, which has been outputted from the driver module 302, is stored in the image log folder 501.

The database 308 (a table storage unit) is provided with a system information table 601 and a user information table 602 as shown in FIG. 6A.

Figures 7A, 7B:
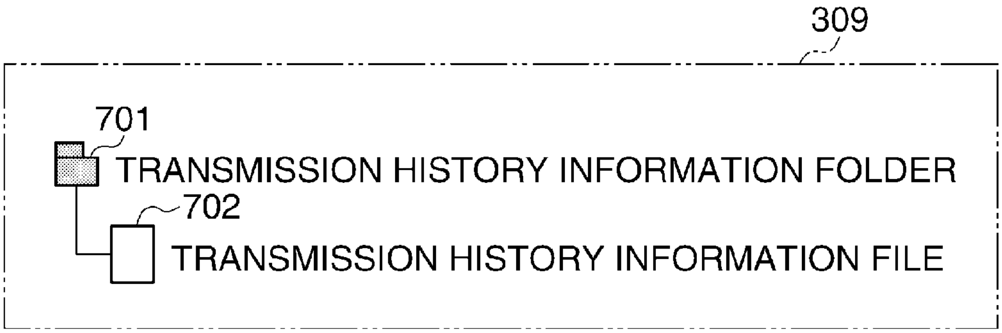

In the transmission history information storage area 309, a transmission history information folder 701 shown in FIG. 7A is provided, and a transmission history information file 702 shown in FIG. 7B, including information identifying the transmission history storage area 331, is stored in the transmission history information folder 701.

The facsimile transmission module 311 performs facsimile transmission to an image forming apparatus via the modem section 235 on the basis of various kinds of data transmitted from the driver module 302.

The transmission request module 321 transmits a transmission request file 402 generated on the basis of dispatch information dispatched from a user or a transmission condition for performing automatic facsimile transmission, to the transmission request storage area 306 in the data communication apparatus 102.

Figure 8:
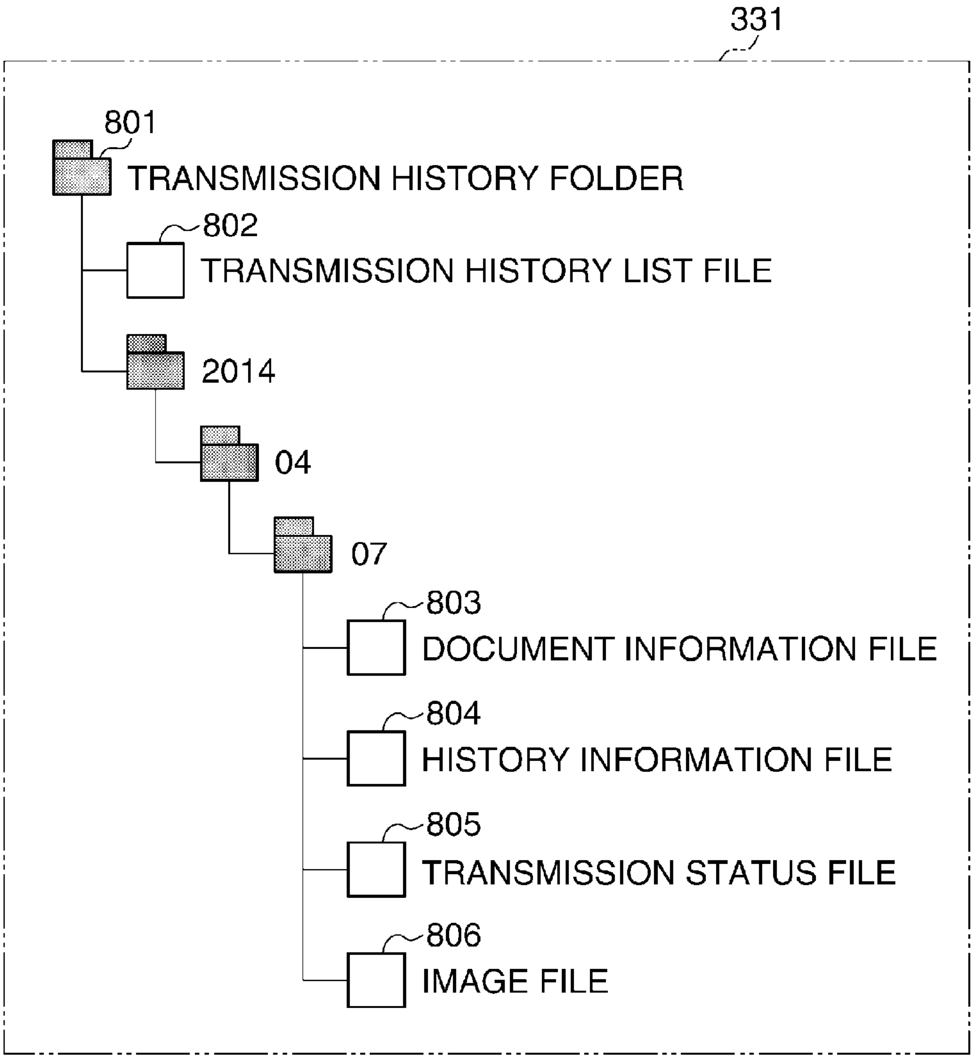
FIG. 8 is a diagram for illustrating a configuration of a transmission history folder in a transmission history storage area in FIG. 3D.

In the transmission history storage area 331, a transmission history folder 801 shown in FIG. 8 is provided. In the transmission history storage area 331, each of a transmission history list file 802 shown in FIG. 9A and a document information file 803 shown in FIG. 9B is stored in a transmission history folder 801. Further, in the transmission history storage area 331, each of a history information file 804 shown in FIG. 9C and a transmission status file 805 shown in FIG. 9D is stored.

Next, details of data processing in the present embodiment will be described.

Figure 10:
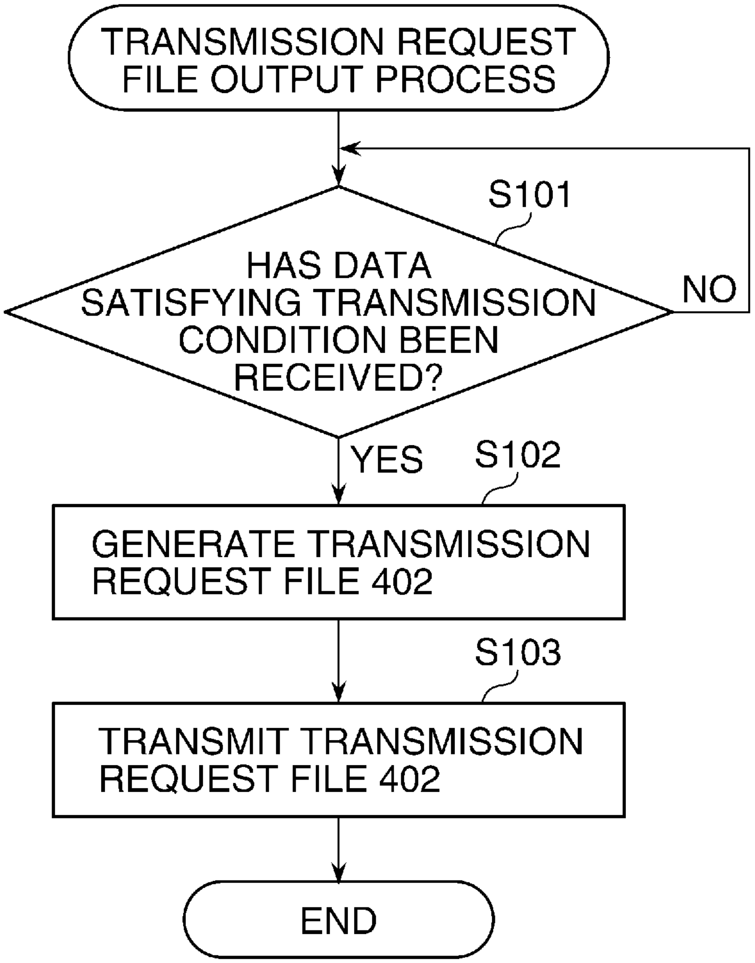
FIG. 10 is a flowchart showing a procedure for a transmission request file output process executed by a transmission request module of FIG. 3C.

FIG. 10 is a flowchart showing a procedure for a transmission request file output process executed by the transmission request module 321 of FIG. 3C.

In the process of FIG. 10, a transmission condition for performing automatic facsimile transmission is set in advance by a user.

In FIG. 10, upon receipt of data satisfying the transmission condition set in advance by the user (step S101), the transmission request module 321 generates the transmission request file 402 shown in FIG. 4B first (step S102). Here, for example, the user previously sets it as the transmission condition that data including the information set for a group of items 403 to 412 in FIG. 4B has been received.

In the present embodiment, when the data including the information set for the group of the items 403 to 412 is received, the transmission request file 402 shown in FIG. 4B is generated on the basis of the information set for the group of the items 403 to 412. Next, the transmission request module 321 transmits the transmission request file 402 to the transmission request folder 401 shown in FIG. 4A (step S103), and the process ends.

Figure 11:
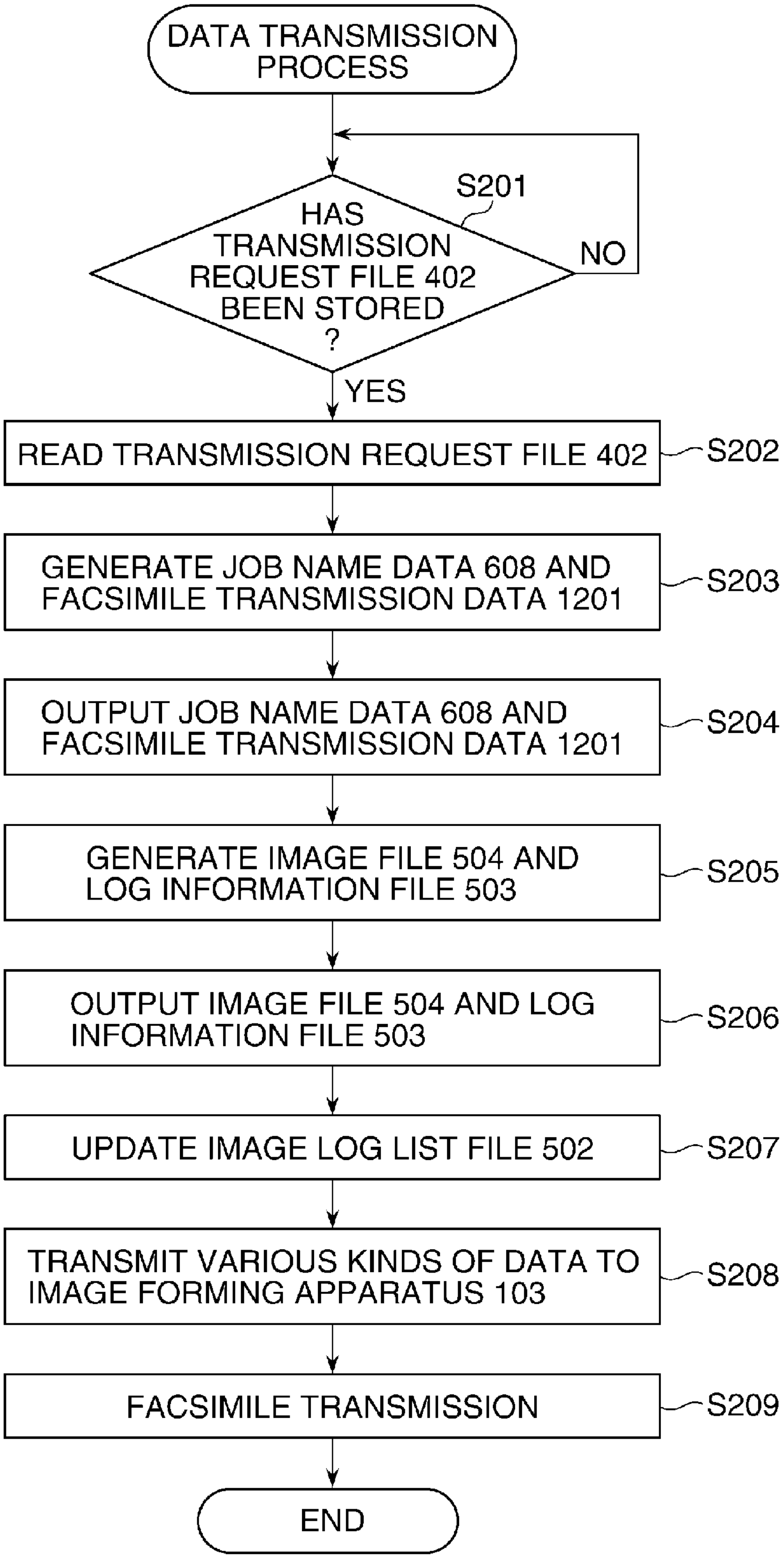
FIG. 11 is a flowchart showing a procedure for a data transmission process executed by the software of FIGS. 3A to 3D.

FIG. 11 is a flowchart showing a procedure for a data transmission process executed by the software 300 to the software 330 of FIGS. 3A to 3D.

The process in FIG. 11 is performed by the CPU 201 in the data communication apparatus 102 executing the program stored in the ROM 203 and the CPU 221 in the image forming apparatus 103 executing the program stored in the ROM 223.

In FIG. 11, the transmission module 301 monitors the transmission request storage area 306 first. When detecting that the transmission request file 402 has been stored into the transmission request folder 401 (step S201: YES), the transmission module 301 reads the transmission request file 402 (step S202).

Next, the transmission module 301 generates the job name data 608 shown in FIG. 6B and the facsimile transmission data 1201 shown in FIG. 12 on the basis of the read transmission request file 402 (step S203). The job name data 608 is generated on the basis of information extracted from the transmission request file 402, information indicating the date and time of having generated the facsimile transmission data 1201, and the system information table 601 shown in FIG. 6C.

The information extracted from the transmission request file 402 includes, specifically, information set for "destination name 403", information set for "destination FAX number 404", information set for "person in charge 405" and information set for "request ID 406".

In the system information table 601, order of arrangement of the pieces of information extracted from the transmission request file 402 is specified. The system information table 601 includes "delimiter character record 610" which is data specifying a delimiter character, "request ID position record 611" and "person-in-charge position record 612" which are data specifying a position in arrangement order corresponding to each of the pieces of information described above. Further, the system information table 601 includes "destination name position record 613", "destination FAX number position record 614" and "date and time position record 615" which are data specifying a position in arrangement order corresponding to each of the pieces of information described above.

In the present embodiment, the pieces of information extracted from the transmission request file 402 are arranged, for example, on the basis of information set for "DATA 609" of the system information table 601. Specifically, "the date and time of having generated facsimile transmission data 1201", "destination FAX number 404", "destination name 403", "person in charge 405" and "request ID 406" are arranged from the right in that order. By providing "_" among the arranged pieces of information, a job name data 608 as shown in FIG. 6B is generated.

Next, the transmission module 301 outputs the job name data 608 and the facsimile transmission data 1201 to the driver module 302. Further, the transmission module 301 outputs the information set for "destination name 403" and information set for "destination FAX number 404" extracted from the transmission request file 402 to the driver module 302 (step S204).

Next, the driver module 302 generates an image file 504 shown in FIG. 5A from the facsimile transmission data 1201. Furthermore, the driver module 302 generates a log information file 503 shown in FIG. 5C on the basis of the information set for "destination name 403" and the information set for "destination FAX number 404" (step S205). Next, the driver module 302 outputs the image file 504 and the log information file 503 to the image log folder 501 (step S206).

Next, the driver module 302 updates the image log list file 502 stored in the image log folder 501 (step S207). In the image log list file 502, the date and time of having outputted the log information file 503 in step S206 is set for "DATE 505" as shown in FIG. 5B.

A predetermined character string is set for "JHDID 506", and the job name data 608 is set for "JOBNAME 507". "Administrator" indicating the identifier of the administrator of the data communication apparatus 102 is set for "USERNAME 508". "JOBTRACKINGID 512" in the log information file 503 is set for "JOBTRACKINGID 509". A storage destination of the log information file 503 is set for "JHR 510". A storage destination of the image file 504 is set for "TIFF 511".

In the present embodiment, if the image log list file 502 is not stored in the image log folder 501, the driver module 302 newly generates an image log list file 502.

Next, the driver module 302 transmits each of the information set for "destination name 403" and the information set for "destination FAX number 404" to the facsimile transmission module 311 in the image forming apparatus 103. Further, the driver module 302 transmits each of the facsimile transmission data 1201, the job name data 608, and information set for "JOBTRACKINGID 512" in the log information file 503 to the facsimile transmission module 311 (step S208).

Next, the facsimile transmission module 311 facsimile-transmits the facsimile transmission data 1201 to the destination of the received information set for "destination FAX number 404" (step S209), and the process ends.

Figure 13:
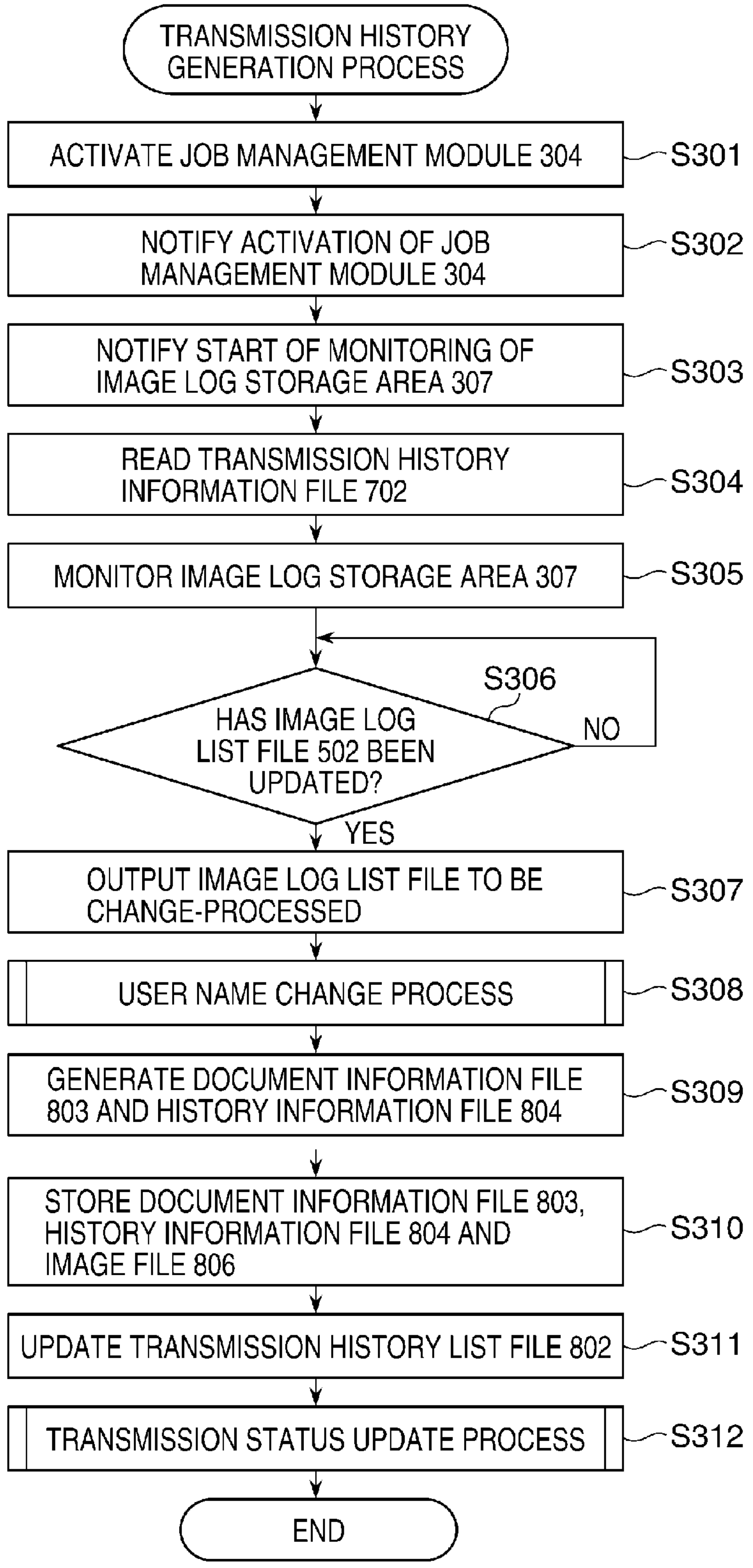
FIG. 13 is a flowchart showing a procedure for a transmission history generation process executed by a job management service module and a job management module in FIG. 3A.

FIG. 13 is a flowchart showing a procedure for a transmission history generation process executed by the job management service module 303 and the job management module 304 in FIG. 3A.

The process of FIG. 13 is performed by the CPU 201 in the data communication apparatus 102 executing the program stored in the ROM 203.

In FIG. 13, the job management service module 303 activates the job management module 304 in response to a control signal outputted from the CPU 201 first (step S301). Next, the job management module 304 notifies the job management service module 303 that the job management module 304 has been activated (step S302).

Next, the job management service module 303 notifies the job management module 304 of start of monitoring of the image log storage area 307 (step S303). Next, the job management module 304 reads the transmission history information file 702 shown in FIG. 7B, which is stored in the transmission history information folder 701 (step S304). The job management module 304 acquires information set for "RootPath 703" identifying the transmission history folder 801 (a storage unit) from the transmission history information file 702.

Next, the job management module 304 monitors the image log storage area 307 (step S305). Next, when the image log list file 502 stored in the image log storage area 307 is updated (step S306: YES), the job management module 304 reads the image log list file 502.

Furthermore, the job management module 304 stores the read image log list file 502 into the RAM 202. Then, the job management module 304 outputs the image log list file 502 stored in the RAM 202 to the plug-in module 305 as an image log list file to be change-processed (step S307).

Next, the job management module 304 executes the user name change process of FIG. 14, which is to be described later, by the plug-in module 305 and extracts information identifying a user who set a transmission condition, which is used in step S101 in FIG. 10, from the image log list file to be change-processed. Furthermore, the plug-in module 305 changes information set for "USERNAME 508" in the image log list file to be change-processed to a specific value corresponding to the user information and generates a changed image log list file (step S308).

Next, the job management module 304 generates each of the document information file 803 in FIG. 9B and the history information file 804 in FIG. 9C on the basis of the log information file 503 and the changed image log list file (step S309) (a generation unit).

In the document information file 803, pieces of information set for "DATE 505" and "JHDID 506" in the changed image log list file are set for "TIME 904" and "JHDID 905", respectively. Further, pieces of information set for "JOBNAME 507" and "USERNAME 508" in the changed image log list file are set for "JOBNAME 906" and "USERNAME 907", respectively.

In the history information file 804, information set for "JOBTRACKINGID 512" in the log information file 503 is set for "JOBTRACKINGID 908". Further, pieces of information set for "NAME 513" and "NUMBER 514" in the log information file 503 are set for "NAME 909" and "NUMBER 910", respectively.

Next, the job management module 304 stores the document information file 803 and the history information file 804 into the transmission history folder 801. Furthermore, the job management module 304 stores the image file 504 stored in the image log folder 501 into the transmission history folder 801 as an image file 806 (step S310).

Next, the job management module 304 updates the transmission history list file 802 shown in FIG. 9A, which is stored in the transmission history folder 801 (step S311). Next, the job management module 304 executes a transmission status update process in FIG. 15, and stores the transmission status file 805 shown in FIG. 9D into the transmission history folder 801 (step S312). Then, the process ends.

Figure 14:
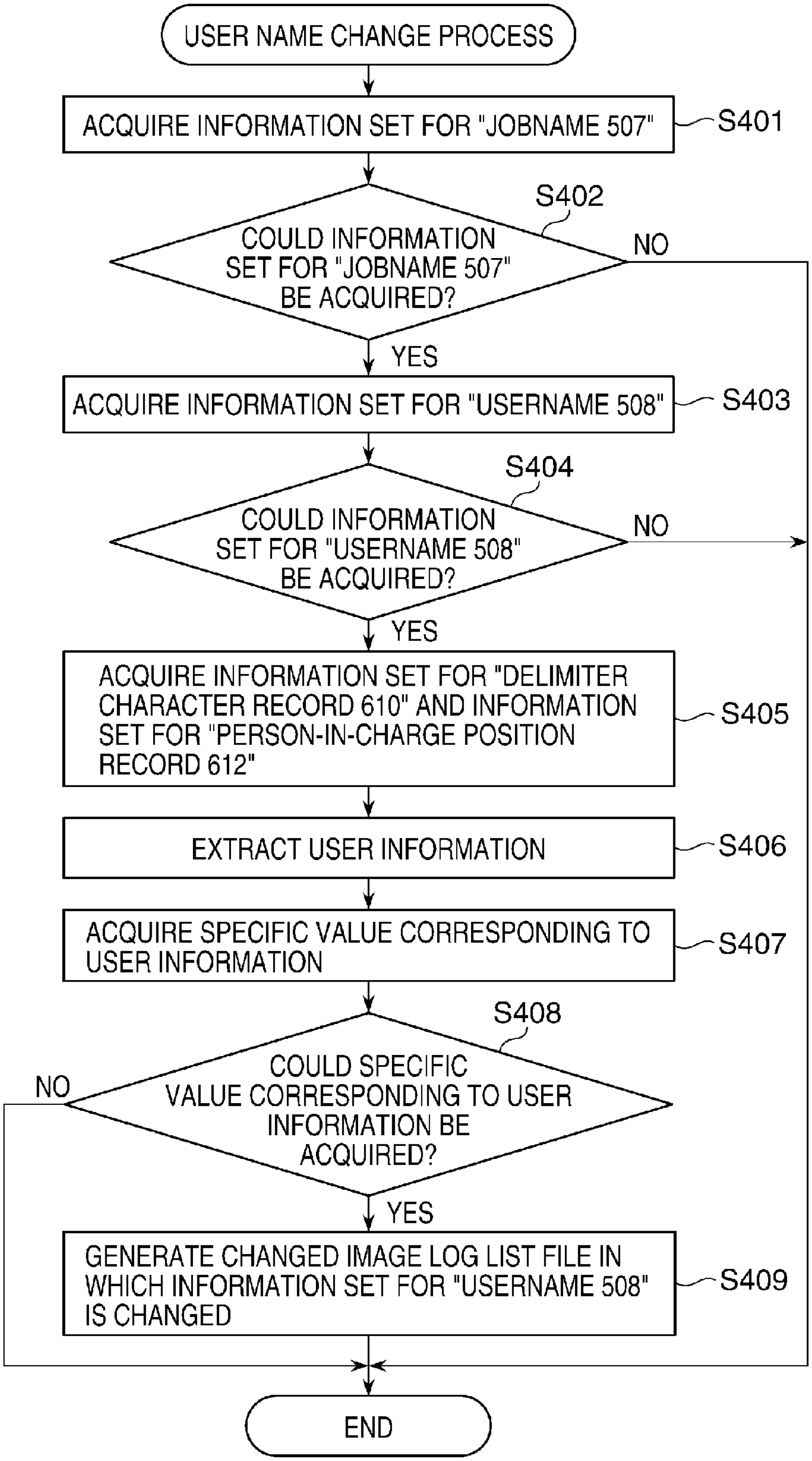
FIG. 14 is a flowchart showing a procedure for a user name change process executed by a plug-in module in FIG. 3A.

FIG. 14 is a flowchart showing a procedure for the user name change process in step S308 of FIG. 13. The user name change process is executed by the plug-in module 305 in FIG. 3A.

In automatic facsimile transmission performed in accordance with a transmission condition set in advance by a user, there may be a case where it is not possible to easily identify the user who gave a data transmission instruction. For example, there may be a case where information identifying a user who gave an instruction to perform automatic data transmission which is performed by a data communication apparatus such as a facsimile server is not stored into history information. In this case, instead of the information identifying the user who gave the data transmission instruction, "Administrator" or the like, which is identifier information about an apparatus administrator, is stored into the history information like "USERNAME 508" in the image log list file 502 shown in FIG. 5B. In this case, it is not possible to identify the user who gave the data transmission instruction from the history information.

In order to cope with this problem, in the process of FIG. 14, information identifying a user who set a transmission condition used in step S101 in the process of FIG. 10 is extracted from the image log list file to be change-processed. Furthermore, in the process of FIG. 14, information set for "USERNAME 508" in the image log list file to be change-processed is changed to a specific value corresponding to the user information, and a changed image log list file is generated.

Specifically, the plug-in module 305 acquires information set for "JOBNAME 507" in the image log list file to be change-processed outputted from the job management module 304 first (step S401). Next, the plug-in module 305 judges whether the information set for "JOBNAME 507" could be acquired or not (step S402).

If the information set for "JOBNAME 507" could be acquired as a result of the judgment in step S402, the plug-in module 305 acquires information set for "USERNAME 508" (step S403). Next, the plug-in module 305 judges whether the information set for "USERNAME 508" could be acquired or not (step S404).

If the information set for "USERNAME 508" could be acquired as a result of the judgment in step S404, the process proceeds to step S405. The plug-in module 305 acquires information set for "delimiter character record 610" and information set for "person-in-charge position record 612" from the system information table 601 (step S405). Next, the plug-in module 305 extracts user information, for example "C-00001" from the information set for "JOBNAME 507" on the basis of the information set for "delimiter character record 610" and the information set for "person-in-charge position record 612" (step S406).

In the present embodiment, for example, the information set for "JOBNAME 507" is divided into pieces of data 603 to 607 on the basis of "delimiter character record 610". Furthermore, person-in-charge information "C-00001" at a fourth position from the right, among the pieces of data 603 to 607, as user information on the basis of "person-in-charge position record 612" which specifies an arrangement destination of person-in-charge information.

Next, the plug-in module 305 acquires a specific value corresponding to the user information extracted in step S406, for example, "Taro Suzuki" from information set for "NAME 616" in the user information table 602 (step S407). Next, the plug-in module 305 judges whether the specific value corresponding to the user information could be acquired in step S407 or not (step S408).

If the specific value corresponding to the user information could be acquired in step S407 as a result of the judgment in step S408, the process proceeds to step S409. The plug-in module 305 generates a changed image log list file in which "USERNAME 508" in the image log list file to be change-processed is changed to "Taro Suzuki" (step S409) (a generation unit), and the process ends. It should be noted that the changed image log list file has the same items as the image log list file 502.

If the information set for "JOBNAME 507" could not be acquired as a result of the judgment in step S402 or if the information set for "USERNAME 508" could not be acquired as a result of the judgment in step S404, the process ends. Further, if the specific value corresponding to the user information could not be acquired in step S407 as a result of the judgment in step S408, the process ends.

According to the process of FIG. 14, a changed image log list file is generated in which "C-00001", information identifying a user who set a transmission condition, included in the name of a job to be executed by the image forming apparatus 103 is set as information indicating a user who gave an instruction to execute the job. Thereby, the user information "C-00001" is reflected on the changed image log list file. As a result, it is possible to identify the user who set the transmission condition from the changed image log list file.

Further, according to the process of FIG. 14, the user information table 602 is stored in which a specific value corresponding to the user information "C-00001" is specified. Furthermore, the changed image log list file is generated on the basis of the specific value specified in the user information table 602, which corresponds to the user information "C-00001" set in the name of the job. Thereby, the specific value corresponding to the user information "C-00001", for example, "Taro Suzuki" is reflected on the changed image log list file. As a result, it is possible to easily identify a user from the changed image log list file.

Figure 15:
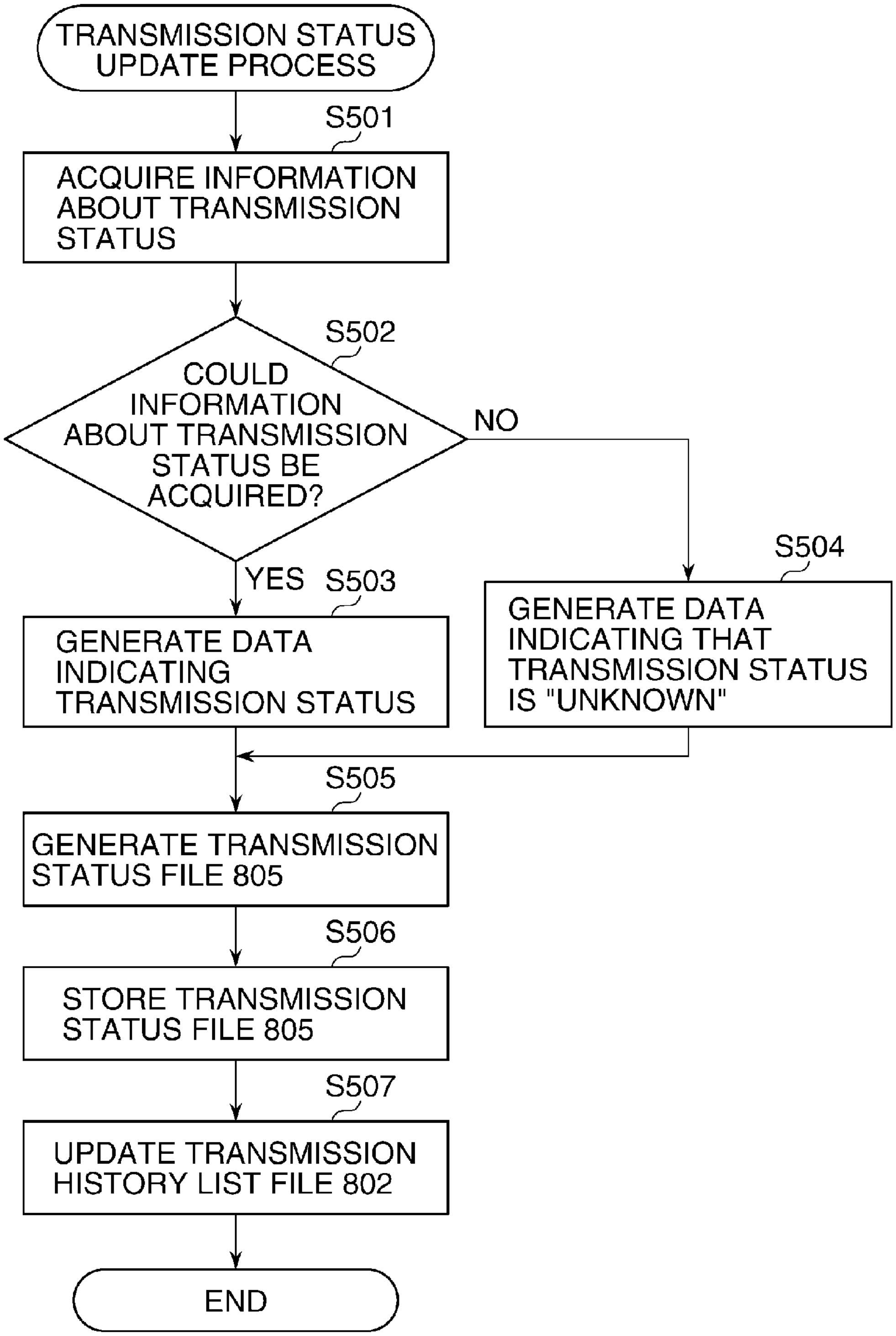
FIG. 15 is a flowchart showing a procedure for a transmission status update process executed by the job management module in FIG. 3A.

FIG. 15 is a flowchart showing a procedure for the transmission status update process in step S312 of FIG. 13. The transmission status update process is executed by the job management module 304 in FIG. 3A.

In FIG. 15, the job management module 304 acquires information about a transmission status from the facsimile transmission module 311 first (step S501). Next, the job management module 304 judges whether the information about the transmission status could be acquired in step S501 or not (step S502).

If the information about the transmission status could not be acquired in step S501 as a result of the judgment in step S502, the process proceeds to step S504. The job management module 304 generates each of data indicating the date and time of having performed the facsimile transmission and data indicating that the transmission status is "unknown" and stores each generated data into the RAM 202 (step S504).

If the information about the transmission status could be acquired in step S501 as a result of the judgment in step S502, the job management module 304 generates each of the data indicating the date and time of having performed the facsimile transmission and the data indicating the transmission status on the basis of the acquired information about the transmission status. Furthermore, the job management module 304 stores each generated data into the RAM 202 (step S503). In the present embodiment, the data indicating the transmission status shows "OK" or the like when facsimile transmission is successful, and the data indicating the transmission status shows "NG" or the like when facsimile transmission fails.

Next, the job management module 304 generates the transmission status file 805 shown in FIG. 9D on the basis of each data stored in step S503 or each data stored in step S504 (step S505). In the transmission status file 805, the date and time of having performed facsimile transmission is set for "ENDTIME 911", and the transmission status is set for "STATUS 912". Next, the job management module 304 stores the transmission status file 805 into the transmission history folder 801 (step S506) and updates the transmission history list file 802 (step S507).

In the transmission history list file 802, a date and time of having stored the transmission status file 805 into the transmission history folder 801 is set for "TIME 901". Further, "Changed" indicating that the transmission history list file 802 has been updated is set for "TYPE 902". Furthermore, the storage destination of the image file 806 is set for "PATH 903". Next, after step S507, the process ends.

It should be noted that, though the database 308 is provided in the data communication apparatus 102 in the present embodiment, the database 308 may be provided on some server.

Though the transmission history storage area 331 is provided in the information processing apparatus 104 in the present embodiment, the transmission history storage area 331 may be provided in an apparatus other than the information processing apparatus 104, for example, in the data communication apparatus 102.

Further, in the present embodiment, file formats of the transmission request file 402, the image log list file 502 and the log information file 503 may be any file format that can be recognized by each component. Further, file formats of the system information table 601, the user information table 602 and the transmission history information file 702 may be any file format that can be recognized by each component. Further, file formats of the transmission history list file 802, the document information file 803, the history information file 804 and the transmission status file 805 may be any file format that can be recognized by each component.

Furthermore, description has been made on an example of replacing the person-in-charge information "C-00001" with a specific value "Taro Suzuki" in the present embodiment, but, if a specific value is inputted in person-in-charge information, the specific value of the person-in-charge information may be immediately reflected on a changed image log list file. By this method also, it is possible to easily identify a user from the changed image log list file.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-145783, filed Jul. 16, 2014, which is hereby incorporated by reference wherein in their entirety.

What is claimed is:

1. A data communication apparatus, comprising:
a memory; and
at least one processor connected to the memory and configured to execute computer program modules, the computer program modules including:
a transmission module that automatically detects a transmission request file stored in a predetermined folder, generates transmission data and job name data based on information extracted from the transmission request file, and outputs the transmission data and the job name data to a driver module,
wherein the information extracted from the transmission request file comprises at least one of a destination name, destination number, person in charge information and a request ID;
the driver module that generates log information based on the transmission data and the job name data received from the transmission module, and causes a job processing apparatus to transmit the transmission data to a destination; and
a job management module that identifies a predetermined part of the job name data including at least one of the information extracted from the transmission request file associated with a user who generated the transmission request file, acquires from a database the name of the user different from and corresponding to the identified predetermined part of the job name data, changes the user information included in the log information to the determined name of the user who generated the transmission request file, and stores history information generated based on the changed user information.

2. A history information storage method executed by an apparatus, the method comprising:
automatically detecting a transmission request file stored in a predetermined folder;
generating transmission data and job name data based on information extracted from the transmission request file,
wherein the information extracted from the transmission request file comprises at least one of a destination name, destination number, person in charge information and a request ID;
transmitting the transmission data to a destination;
generating log information based on the transmission data and the job name data;
causing a job processing apparatus to process the transmission data;
identifying a predetermined part of the job name data including at least one of the information extracted from the transmission request file associated with a user who generated the transmission request file;
acquiring from a database the name of the user different from and corresponding to the identified predetermined part of the job name data;
changing user information included in the log information to the determined name of the user who generated the transmission request file; and
storing history information generated based on the changed user information.

3. A non-transitory storage medium storing instructions executed by a computer including a memory and at least one processor connected to the memory and configured to execute instructions, the instructions implementing the steps of:
automatically detecting a transmission request file stored in a predetermined folder;
generating transmission data and job name data based on information extracted from the transmission request file,
wherein the information extracted from the transmission request file comprises at least one of a destination name, destination number, person in charge information and a request ID;
transmitting the transmission data to a destination;
generating log information based on the transmission data and the job name data received from the transmission module, and causing a job processing apparatus to process the transmission data;
identifying a predetermined part of the job name data including at least one of the information extracted from the transmission request file associated with a user who generated the transmission request file;
acquiring from a database the name of the user different from and corresponding to the identified predetermined part of the job name data;
changing the user information included in the log information to the determined name of the user who generated the transmission request file; and
storing history information generated based on the changed user information.

4. A data communication apparatus comprising:
a memory; and
at least one processor connected to the memory and configured to execute computer program modules, the computer program modules including:
a transmission module that automatically detects a transmission request file stored in a predetermined folder, generates a job and job name data based on information extracted from the transmission request file, and outputs the job and the job name data to a driver module,
wherein the information extracted from the transmission request file comprises at least one of a destination name, destination number, person in charge information and a request ID;
the driver module that causes a job processing apparatus to transmit the job to a destination; and
a job management module that identifies a predetermined part of the job name data including at least one of the information extracted from the transmission request file associated with a user who generated the transmission request file, acquires from a database the name of the user different from and corresponding to the identified predetermined part of the job name data, and sets user information included in log information of the job to the determined name of the user who generated the transmission request file.

5. A method for controlling a data communication apparatus, the method comprising:

automatically detecting a transmission request file stored in a predetermined folder;

generating a job and job name data based on information extracted from the transmission request file, wherein the information extracted from the transmission request file comprises at least one of a destination name, destination number, person in charge information and a request ID;

causing a job processing apparatus to transmit the job to a destination;

identifying a predetermined part of the job name data including at least one of the information extracted from the transmission request file associated with a user who generated the transmission request file;

acquiring from a database the name of the user different from and corresponding to the identified predetermined part of the job name data; and setting user information included in log information of the job to the determined name of the user who generated the transmission request file.

6. A non-transitory storage medium storing instructions executed by a computer including a memory and at least one processor connected to the memory and configured to execute instructions, the instructions implementing the steps of:

automatically detecting a transmission request file stored in a predetermined folder;

generating a job and job name data based on information extracted from the transmission request file, wherein the information extracted from the transmission request file comprises at least one of a destination name, destination number, person in charge information and a request ID;

transmitting transmission data associated with the job to a destination;

causing a job processing apparatus to process the job;

identifying a predetermined part of the job name data including at least one of the information extracted from the transmission request file associated with a user who generated the transmission request file;

acquiring from a database the name of the user different from and corresponding to the identified predetermined part of the job name data; and setting user information included in log information of the job to the determined name of the user who generated the transmission request file.

* * * * *